(12) United States Patent
Huber (10) Patent No.: US 6,517,028 B2
(45) Date of Patent: Feb. 11, 2003

(54) FREIGHT LOADING SYSTEM (75) Inventor: Thomas Huber, Schliersee (DE)

(73) Assignee: Telair International GmbH, Hausham (DE)

( * ) Notice: Subject to any disclaimer, the term of this patent is extended or adjusted under 35 U.S.C. 154(b) by 0 days.

(21) Appl. No.: 09/915,782

(22) Filed: Jul. 26, 2001

(65) Prior Publication Data
US 2002/0020782 A1 Feb. 21, 2002

(30) Foreign Application Priority Data

Aug. 11, 2000 (DE) .......................................... 100 39 365
Sep. 1, 2000 (DE) .......................................... 100 43 180

(51) Int. Cl.⁷ .............................. B64C 1/22; B64D 9/00
(52) U.S. Cl. .................................. 244/137.1; 244/118.1; 414/536; 410/82
(58) Field of Search ............................ 244/118.1, 137.1; 198/788, 494, 495, 493; 414/529, 532; 193/35 SS, 35 R; 410/77, 92

(56) References Cited

U.S. PATENT DOCUMENTS

| | | | | | |
|---|---|---|---|---|---|
| 3,741,504 A | * | 6/1973 | Alberti et al. | ............ | 244/137.1 |
| 4,077,590 A | * | 3/1978 | Shorey | ............ | 244/118.1 |
| 4,457,649 A | * | 7/1984 | Vogg et al. | ............ | 244/137.1 |
| 4,832,185 A | * | 5/1989 | Huber | ............ | 244/137.1 |
| 5,090,639 A | * | 2/1992 | Miller et al. | ............. | 244/118.1 |
| 5,316,242 A | * | 5/1994 | Eilenstein-Wiegmann et al. | ......................... | 244/137.1 |
| 5,346,161 A | * | 9/1994 | Eilenstein-wiegmann et al. | ......................... | 244/137.1 |
| 5,370,342 A | * | 12/1994 | Nordstrom | ............... | 244/118.1 |
| 5,927,650 A | * | 7/1999 | Huber | ...................... | 244/118.1 |
| 6,051,133 A | | 4/2000 | Huber | ...................... | 244/137.1 |

FOREIGN PATENT DOCUMENTS

DE 198 08 659 A1 9/1999

* cited by examiner

Primary Examiner—Galen L. Barefoot
(74) Attorney, Agent, or Firm—Merchant & Gould P.C.

(57) ABSTRACT

A loading system for loading a cargo deck in a cargo space of an aircraft with cargo holders is proposed, in which there are provided two pairs of mounting tracks with support rollers and transverse cargo latches, a middle mounting rail for the attachment of transverse cargo latches, and rows of side-mounted transverse cargo latches. The distance between the outer mounting track of each pair of mounting tracks and the middle mounting rail corresponds to a first, lesser fixation distance of relatively smaller cargo holders (LD2). The distance between the outer mounting track of one pair and the inner mounting track of the opposite pair corresponds to a second, greater transverse fixation distance of relatively larger cargo holders (LD3). As a result it is possible to load a cargo space optimally even if the construction of the aircraft produces constrictions of the cargo space.

11 Claims, 12 Drawing Sheets

FREIGHT LOADING SYSTEM

FIELD OF THE INVENTION

The present invention relates to a freight loading system for use in loading a cargo deck in a cargo space of an aircraft.

DESCRIPTION OF THE PRIOR ART

Loading systems of this kind are needed to store pallets, containers or similar standardized cargo holders in an aircraft in such a way that the storage process takes place rapidly and reliably. "Reliably" here means in particular that the cargo holders are fixed in their final position within the cargo space in such a way that they cannot move away from that position. The system must also be very easy to operate, not to say "idiot-proof", because well-trained cargo personnel are often not available.

Another problem to be treated in particular here is that despite the above requirements, the freight loading system cannot be made arbitrarily elaborate, because in the context of air-freight transport every gram counts. Finally, elaborate freight loading systems also present the problem that as the number of parts increases, so does the likelihood of malfunction.

Transverse and longitudinal locking mechanisms for fixation of the cargo holders are known, for example, from the German patents DE 198 54 189 or DE 198 08 659. Mounting tracks that accommodate roller drive units are known, for example, from DE 197 22 468.7.

The object of the present invention is to provide a loading system for loading a cargo deck in a cargo space of an aircraft that is designed so as to produce reliable storage by a simple means.

SUMMARY OF THE INVENTION

According to the present invention there is provided a loading system for loading a cargo deck in a cargo space of an aircraft with standardized cargo holders such as LD2 and LD3 containers, comprising a plurality of support rollers for supporting a cargo holder and conveying it along a long axis of the cargo space of the aircraft;

a plurality of roller drive units for propelling a cargo holder;

a plurality of transverse cargo latches for fixing and locking a cargo holder into position in a direction transverse to said long axis;

two pairs of mounting tracks for mounting the support rollers and said transverse cargo latches;

a middle row of transverse cargo latches located between the two pairs of mounting tracks;

a plurality of longitudinal cargo latches for fixing and locking a cargo holder into position in the direction of said long axis; and first and second rows of further side-mounted transverse cargo latches which are respectively located at a first outer edge of the cargo deck and at a second outer edge of the cargo deck on an opposite side to the first outer edge;

the two pairs of mounting tracks being respectively disposed between the middle row and one of the first and the second rows of side-mounted transverse cargo latches, and each pair of mounting tracks comprising an outer mounting track and an inner mounting track, and the distance between the outer mounting track of each pair of mounting tracks and the middle row of transverse cargo latches corresponding to a first, lesser fixation distance of a first relatively smaller standardized cargo holder, and the distance between the outer mounting track of each pair of mounting tracks and the inner mounting track of the opposite pair of mounting tracks corresponding to a second, greater fixation distance of a second relatively larger standardized cargo holder.

Hence, with a minimized number of transport and attachment elements, that is cargo latches, arranged in precisely specified rows, a maximal number of storage possibilities can be provided even when the cargo space is limited or at least is constricted in certain places by built-in equipment (e.g., receptacles for the landing gear).

Preferably, the outer mounting tracks are designed to support side-mounted transverse cargo latches. As a result, maximal utilization of space is ensured.

The distance between each row of side-mounted transverse cargo latches and the closest inner mounting track, with the transverse cargo latches it supports, preferably corresponds to the first, lesser fixation distance. By this means a broader region of the loading space can be used to store one (or two) relatively narrow cargo holders at the very edge of the loading space.

Furthermore, the distance between each row of side-mounted transverse cargo latches and the middle row of transverse cargo latches is made to correspond to the second, greater fixation distance. Thus it is possible to transport a relatively large cargo holder, which extends to the outermost edge of the loading space, into a broader region of the loading space and to store it there.

The distance between each row of side-mounted transverse cargo latches of the first or second row and the inner mounting track that is closer to the second or first, respectively, outer edge of the cargo deck, with the transverse cargo latches mounted thereon, is designed to correspond to the second, greater fixation distance. With this arrangement in a narrower region of the cargo space a relatively large cargo holder can be stored at the edge, insofar as is at all possible.

In a preferred embodiment the mounting tracks are constructed for the installation of roller drive units, such as is known per se from the DE 198 54 189. As a result, the floor of the cargo space is largely kept free of roller drive units, which makes it easier to survey and reduces the risk of injury and damage. Furthermore, it is also possible to provide brake rollers or drainage systems to remove water from the mounting tracks and/or the cargo deck.

In another preferred embodiment, which can also be incorporated into other designs, the cargo deck is provided with recesses for the installation of roller drive units, preferably disposed between the mounting tracks of the pairs. Such roller drive units can be constructed with relatively large drive rollers for the transport of heavy cargo holders.

Finally, the mounting tracks are preferably also designed for the mounting of longitudinal cargo latches, so that all the locking units and rollers needed to transport the cargo holders and fix them in position can be installed in the mounting tracks.

Preferred embodiments of the invention will now be described by way of example with reference to the accompanying drawings.

DESCRIPTION OF THE PREFERRED EMBODIMENTS

In the following description, the same reference numerals are used for identical parts or parts with identical actions.

Figure 1:
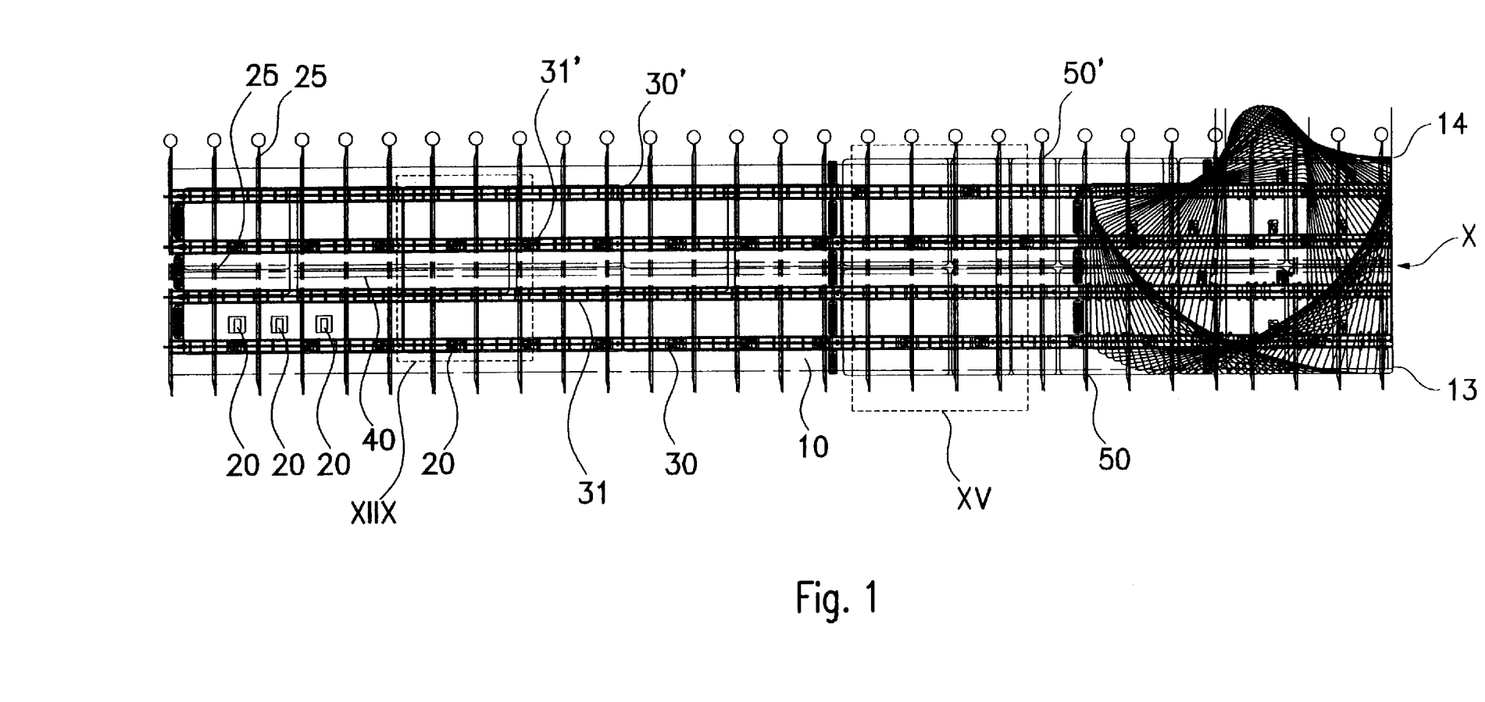
FIG. 1 is a plan view of a cargo or loading deck.

As can be seen in FIG. 1, on or in a cargo deck 10 there are disposed, oriented in the direction of a long axis X of the cargo deck 10, a middle row 40 of elements which are described in more detail below. The elements 40 are located substantially in the exact middle of the cargo deck 10 and on each side thereof is a pair of mounting tracks, namely an outer mounting track 30 or 30' and an inner mounting track 31 or 31'. In the mounting tracks 30, 30'; 31, 31' and in the middle row 40, support rollers 11 (see, e.g., FIGS. 2, 3, 10) are provided. These are rollers 11 are passive elements over which the objects to be conveyed can be displaced with little friction. Furthermore, at a first edge 13 and a second edge 14 of the cargo deck 10 are respectively disposed a row 50 or 50' (see FIG. 15) of transverse cargo latches 25 and supplementary support rollers 10. Transverse cargo latches 25 of the same kind are additionally disposed in the mounting tracks 30, 30'; 31, 31' and in the middle row 40 (in the latter case, screwed substantially directly to the Cargo deck or the underlying carrier).

To transport the objects of cargo, roller drive units 20 known per se are used. To illustrate more clearly the variability of the system, in the embodiment according to FIG. 1 some of these on one side of the middle row 40 are shown to be disposed in recesses in the cargo deck between the outer mounting track 30 and the inner mounting track 31. On the other side of the middle mounting rail 40 the roller drive units 20 are installed within the outer mounting track 30'. Alternatively, however, or in addition they can advantageously be installed within the inner mounting track 31 or 31'. Here the primary considerations are the kind of cargo holders to be transported and their weights or masses.

Figure 2:
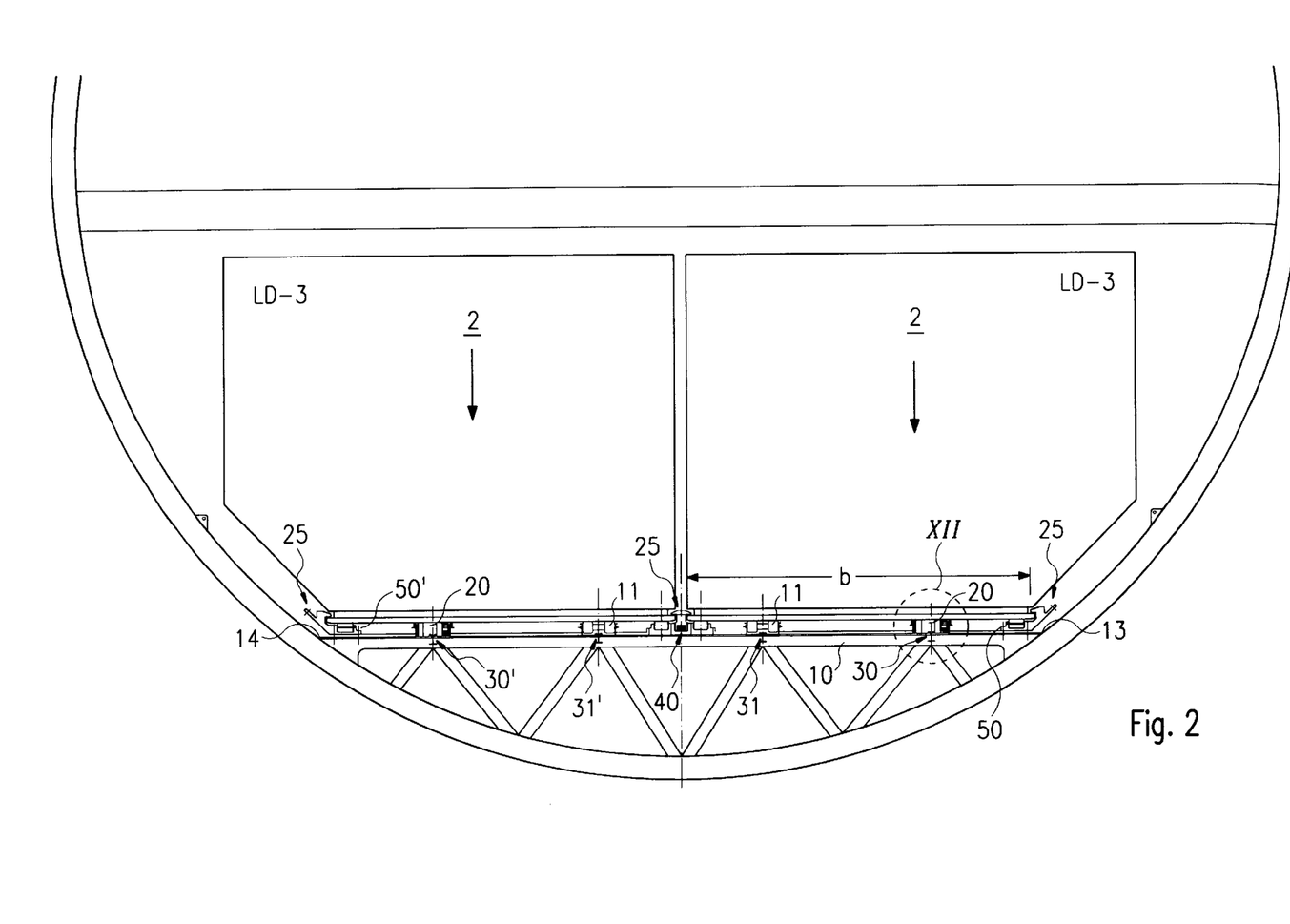
FIG. 2 is a partial cross section through a fuselage with a cargo or loading deck on which relatively large containers are positioned.

In FIG. 2 is a diagram of a section through an aircraft, in which it can be seen that two relatively large transport containers 2 with a greater fixation distance b completely fill up the cargo deck, being kept in place by the side-mounted transverse cargo latches 25 and by the transverse cargo latches 25 disposed in the middle row 40. The roller drive units 20 in this case are installed in the outer track 30, 30' of each mounting-track pair.

Figure 3:
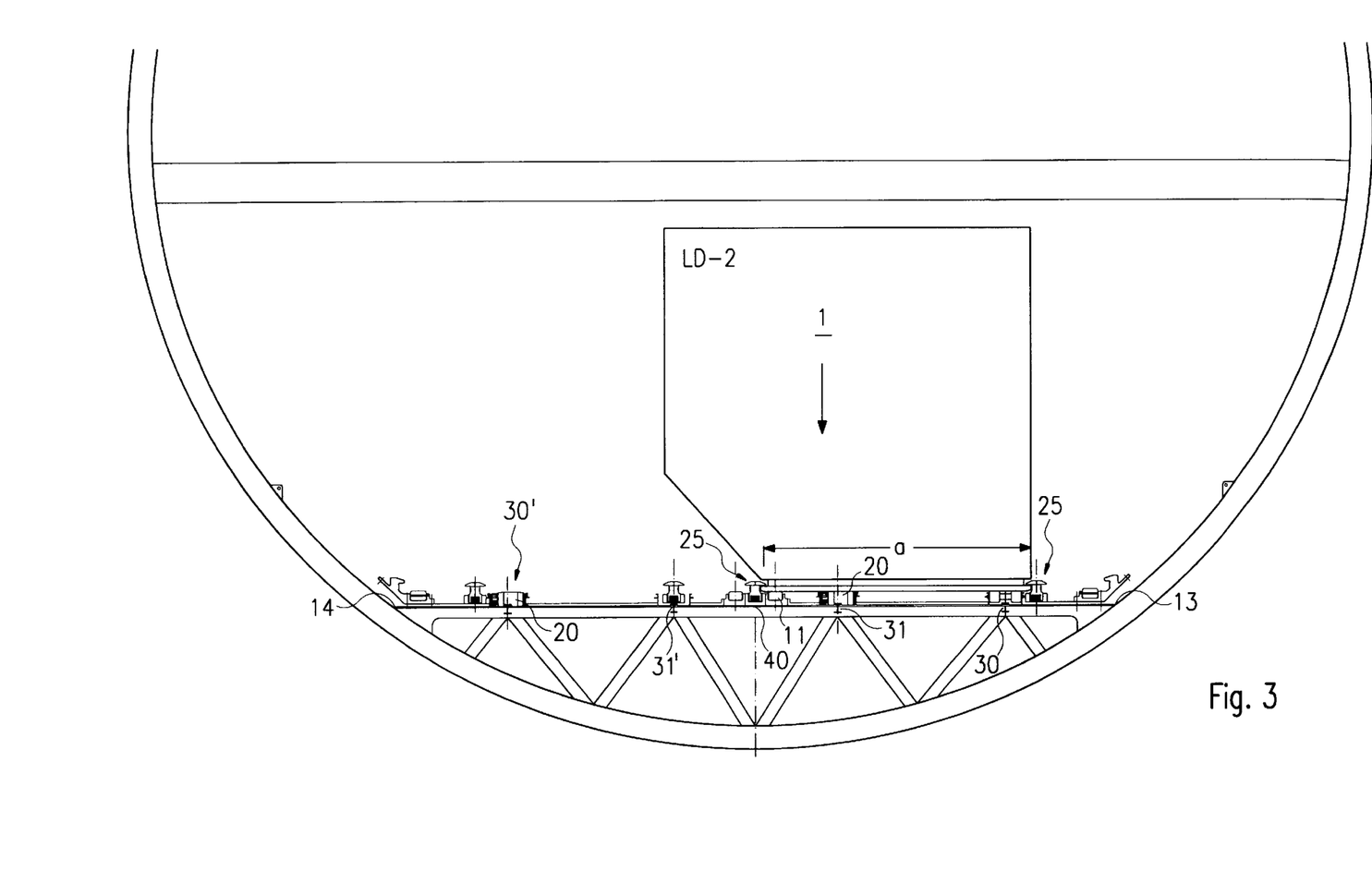
FIG. 3 is a view similar to that of FIG. 2, but showing only one, smaller container.

FIG. 3 shows how a single smaller container 1 with a lesser fixation distance a can be protected against slipping sideways, namely by clamping it between transverse cargo latches 25 that are installed in an outer mounting track 30, or on its outer side, and transverse cargo latches 25 in the middle row 40. Here the container is transported by means of roller drive units 20 that are mounted in both the outer and the inner mounting track 30 and 31. Such an arrangement can be selected, for example, when between the outer edge 13 or 14 and the outer mounting tracks 30, 30' obstacles are present, such as objects installed in the aircraft.

Figure 4:
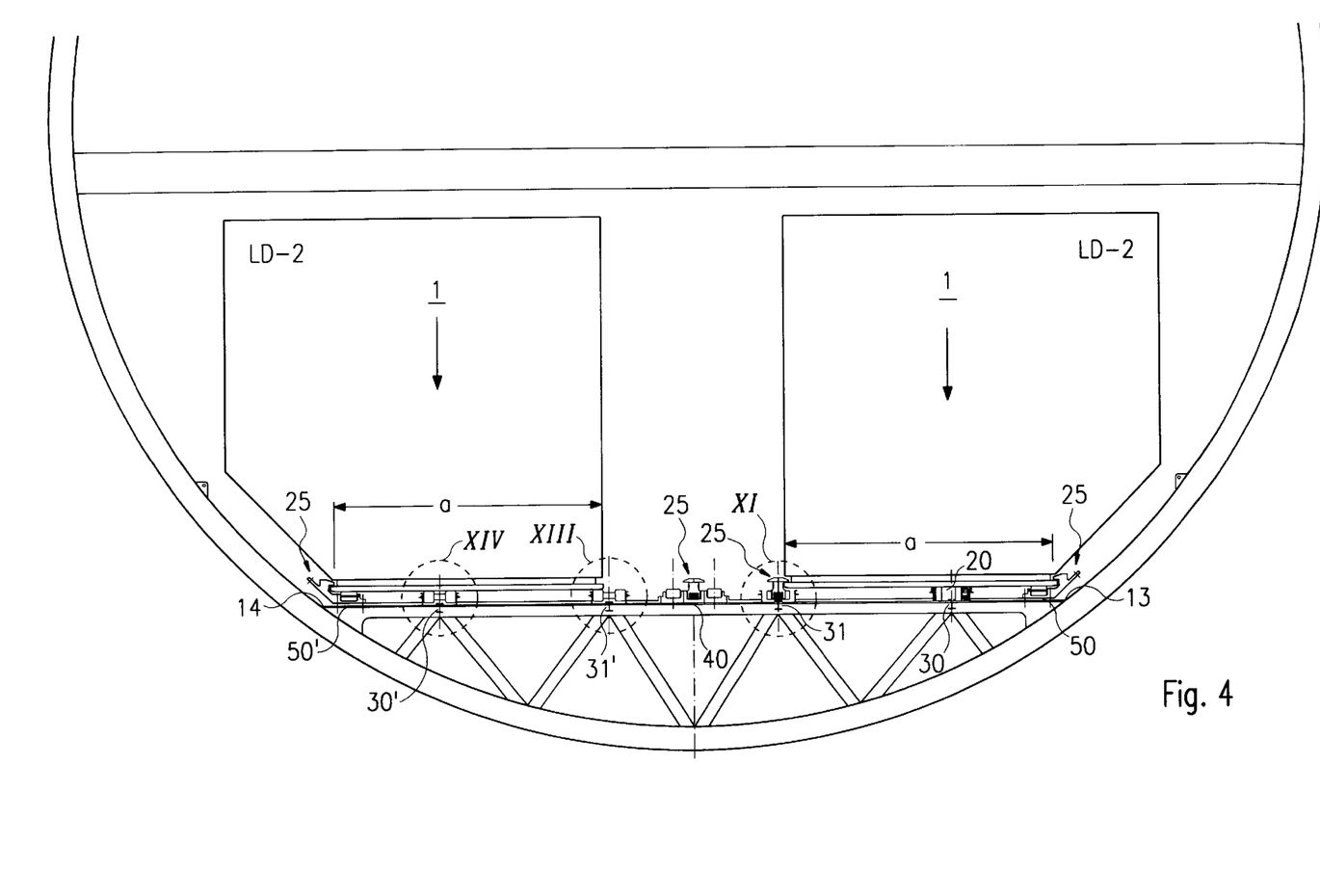
FIG. 4 is a view similar to that of FIG. 2, but showing two of the smaller containers.

From FIG. 4 it is evident that smaller containers 1 can also be held between the side-mounted transverse cargo latches 25 in the rows 50, 50', at the edges of the deck, and the transverse cargo latches 25 mounted in the inner mounting tracks 31, 31', because the distance between these latches 25 corresponds to the lesser fixation distance a of the smaller containers 1.

Figure 5:
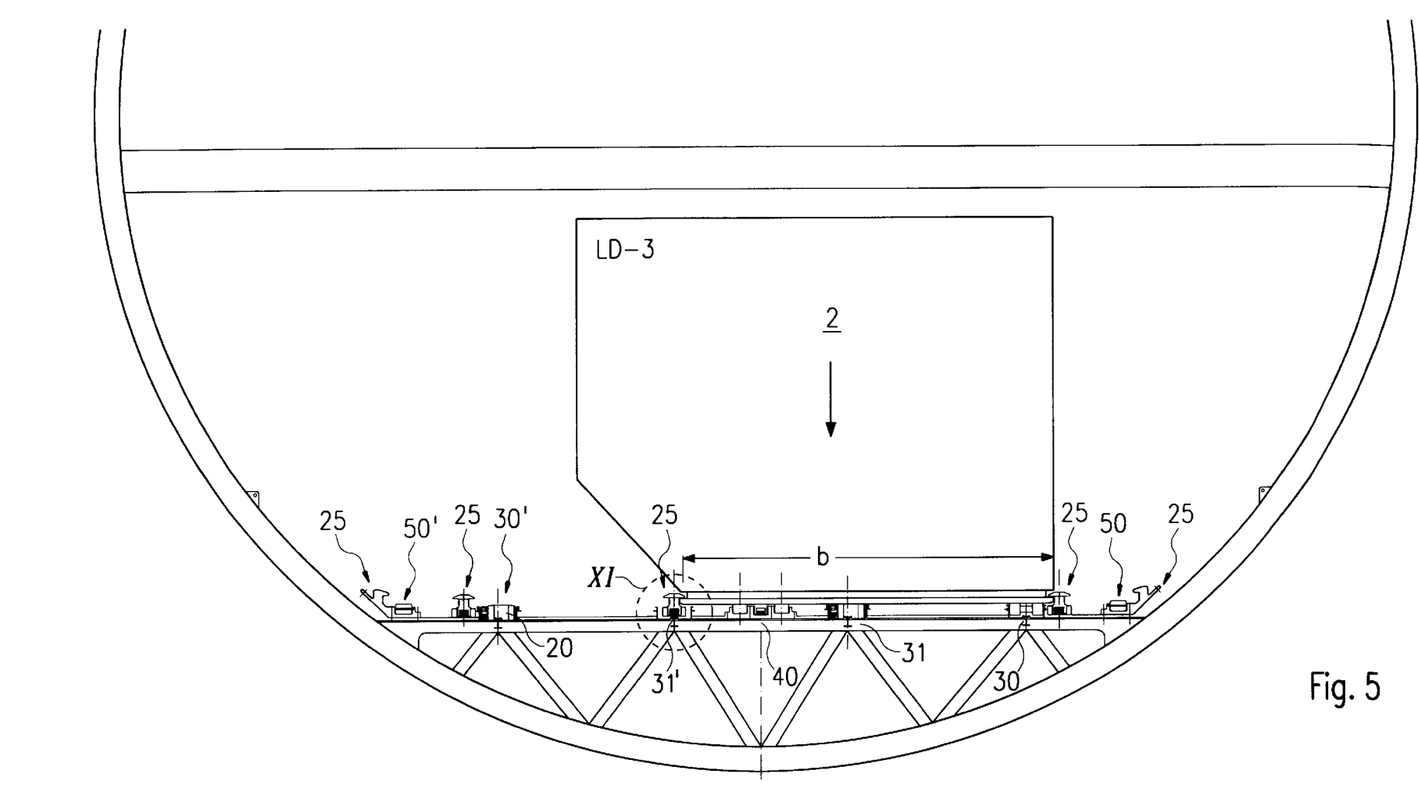
FIG. 5 is a view similar to that of FIG. 2 but showing only one of the larger containers.

Finally, FIG. 5 shows that a larger container 2 with its greater fixation distance b can be fixed between the outer mounting tracks 30, 30' with the transverse cargo latches 25 mounted there, and the opposite tracks of the pair on the other side of the middle row 40, namely the inner mounting tracks 31' or 31, respectively, with the clamps 25 mounted there. Here, again (as in the arrangement shown in FIG. 3) it is possible for containers, including the larger containers 2, to be transported past an obstacle installed in the aircraft.

The mounting tracks 30, 30', sections of which are shown in FIGS. 6–10, are designed to receive roller drive units 20, transverse cargo latches 25 (not shown here) and longitudinal cargo latches 27. In addition, support rollers 11 are mounted in such a way as to enable the containers to be displaced without jolting. The longitudinal cargo latches 27 are distributed over the entire length of the cargo deck 10, within the mounting tracks 30, 31; 30', 31', in such a way as to enable maximally dense loading. For this purpose all the components that can be mounted in the mounting tracks, namely longitudinal cargo latches 27, transverse cargo latches 25 and roller drive units 20 as well as support rollers 11 can be moved to different places in a raster (corresponding to the known seating rails) and can be fixed in position with a few manual operations.

Figures 6, 7, 8:
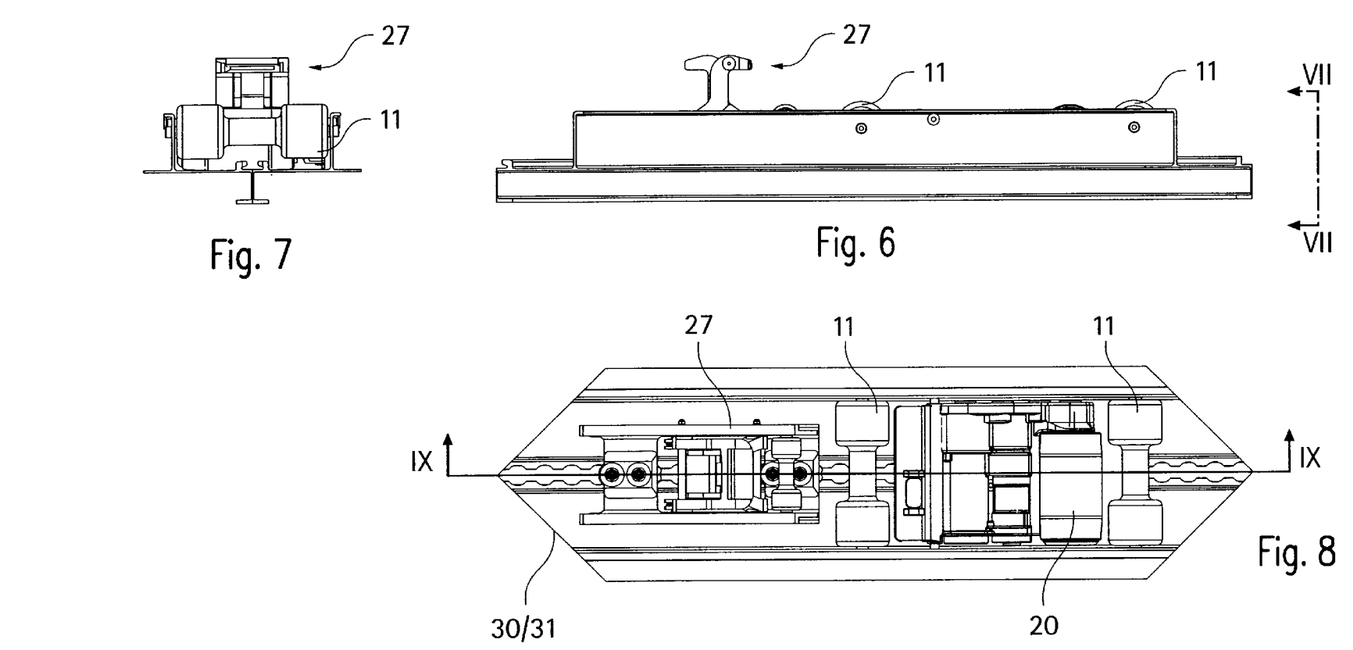
FIG. 6 is a side view of a mounting track with components mounted thereon.
FIG. 7 is a view along the line VII—VII in FIG. 6.
FIG. 8 is a plan view of the mounting track shown in FIG. 6.
Figure 9:
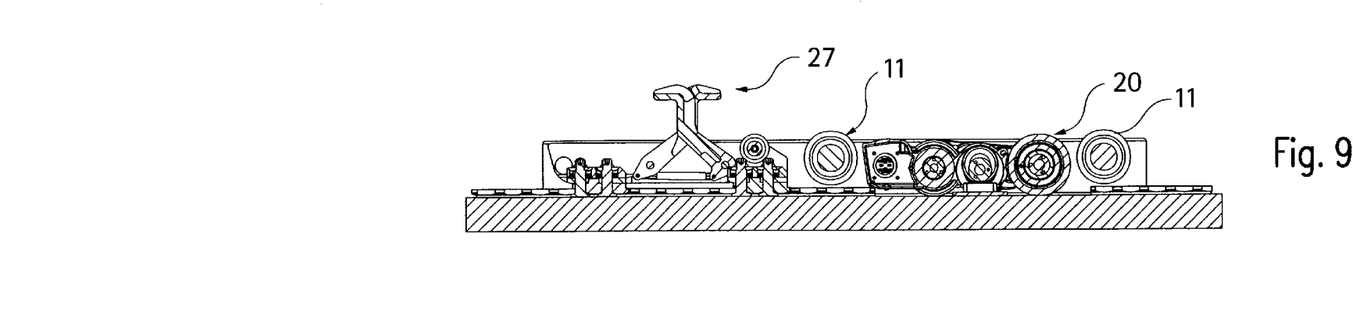
FIG. 9 is a sectional view along the line IX—IX in FIG. 8.
Figure 10:
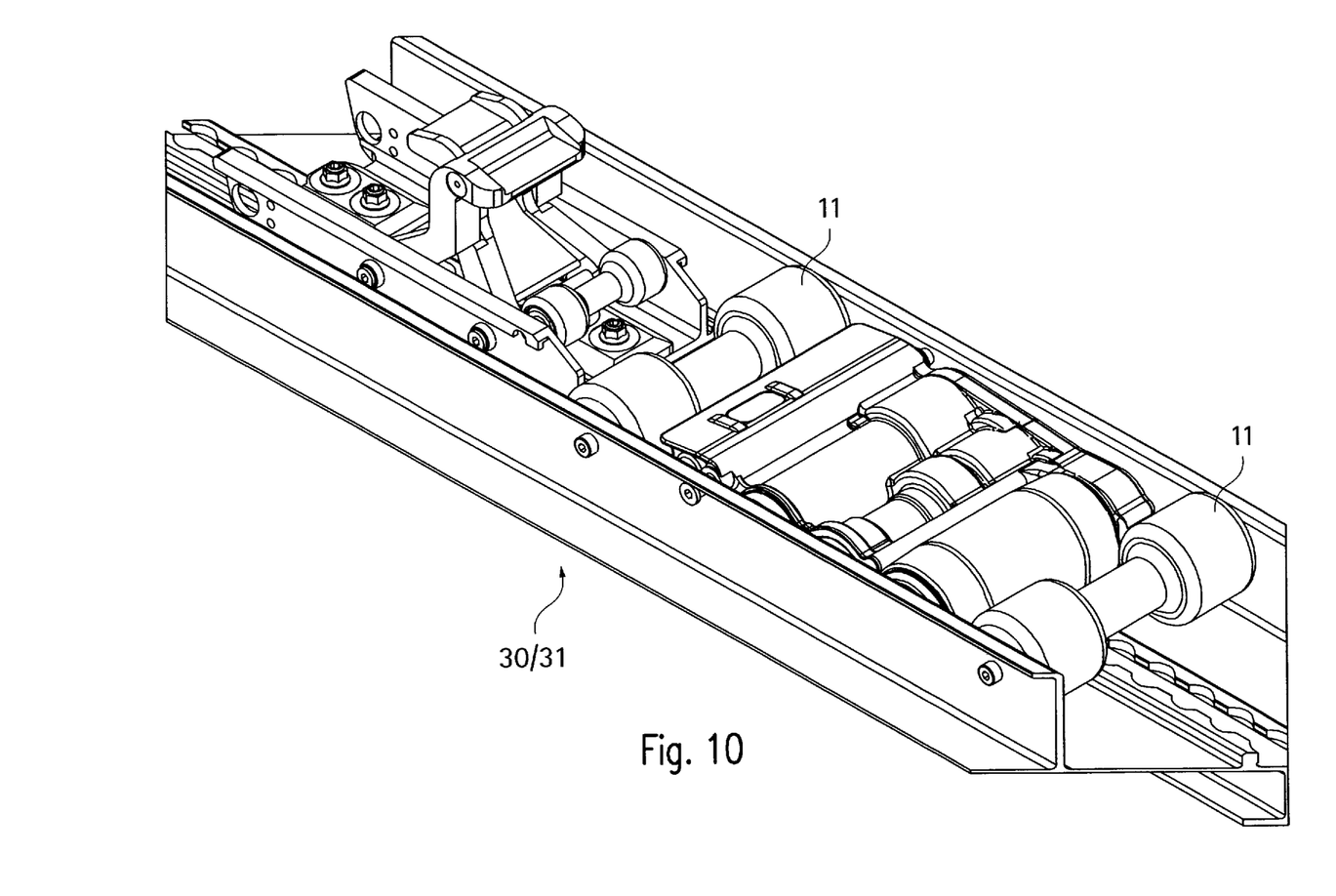
FIG. 10 is a perspective view of the mounting track shown in FIGS. 6 to 9.

FIGS. 7 and 10 show particularly that the support rollers 11 are attached within side walls of the mounting tracks 30, 31. The latches 27 are attached by means of threaded bolts to perforated rails in the tracks 30, 31, so that they can easily be shifted to predetermined places and fixed in position there.

Figure 11:
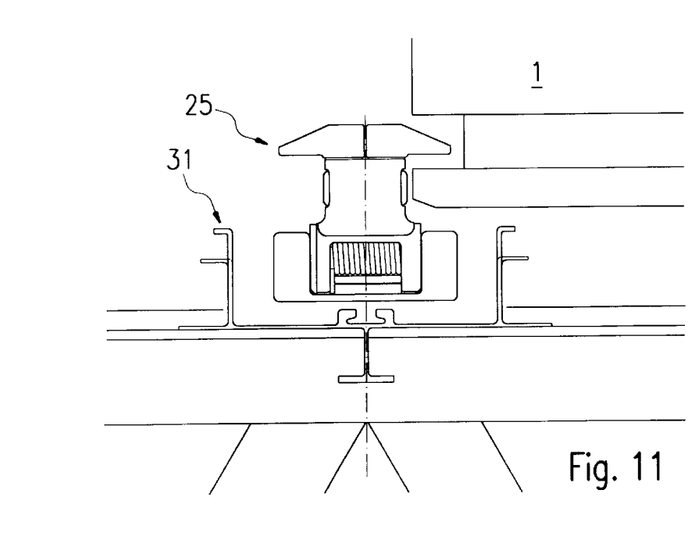
FIG. 11 is a view to an enlarged scale showing in greater detail the region XI in FIG. 4.
Figure 12:
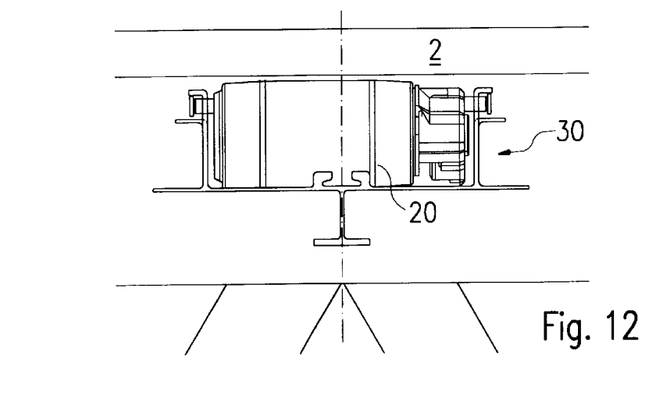
FIG. 12 is a view to an enlarged scale showing in greater detail the region XII in FIG. 2.

In FIGS. 11–14 the arrangements described with reference to FIGS. 2–5 are shown in greater detail. In FIG. 11 a transverse cargo latch 25 that is locking a container 1 in place is mounted in an inner mounting track 31 as shown in FIG. 4. FIG. 12 shows a region of the drawing in FIG. 2 in which the roller drive unit is seated under the floor of a container 2 and is mounted in the outer mounting track 30. Other roller drive units 30 of the same kind are situated in the other mounting tracks.

Figure 13:
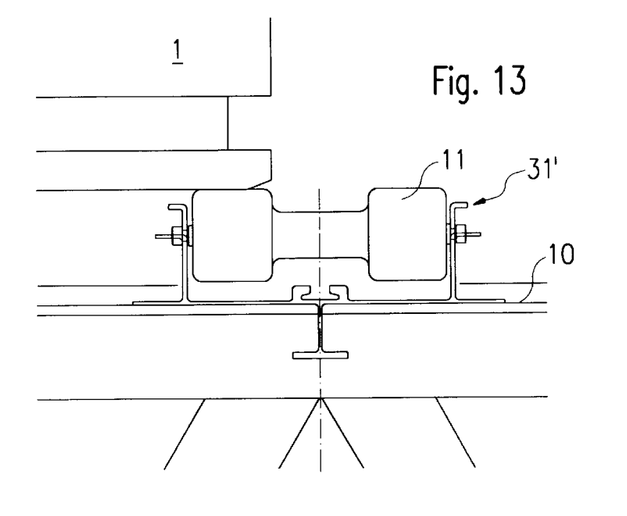
FIG. 13 is a view to an enlarged scale showing in greater detail the region XIII in FIG. 4.
Figure 14:
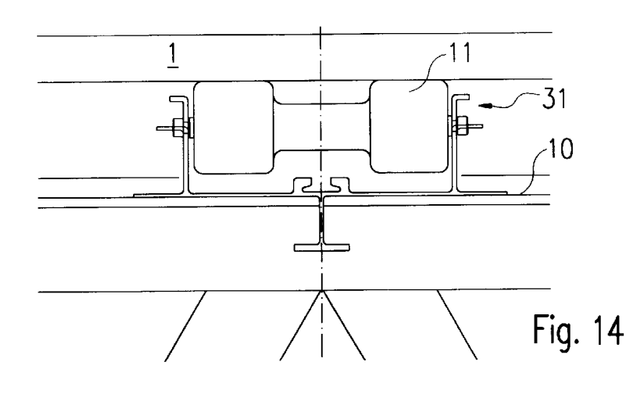
FIG. 14 is a view to an enlarged scale showing in greater detail the region XIV in FIG. 4.

FIGS. 13 and 14 show regions of FIG. 4 enlarged to make clear how the floors of containers 1 rest on support rollers 11 within mounting tracks 30' and 31'.

Figure 15:
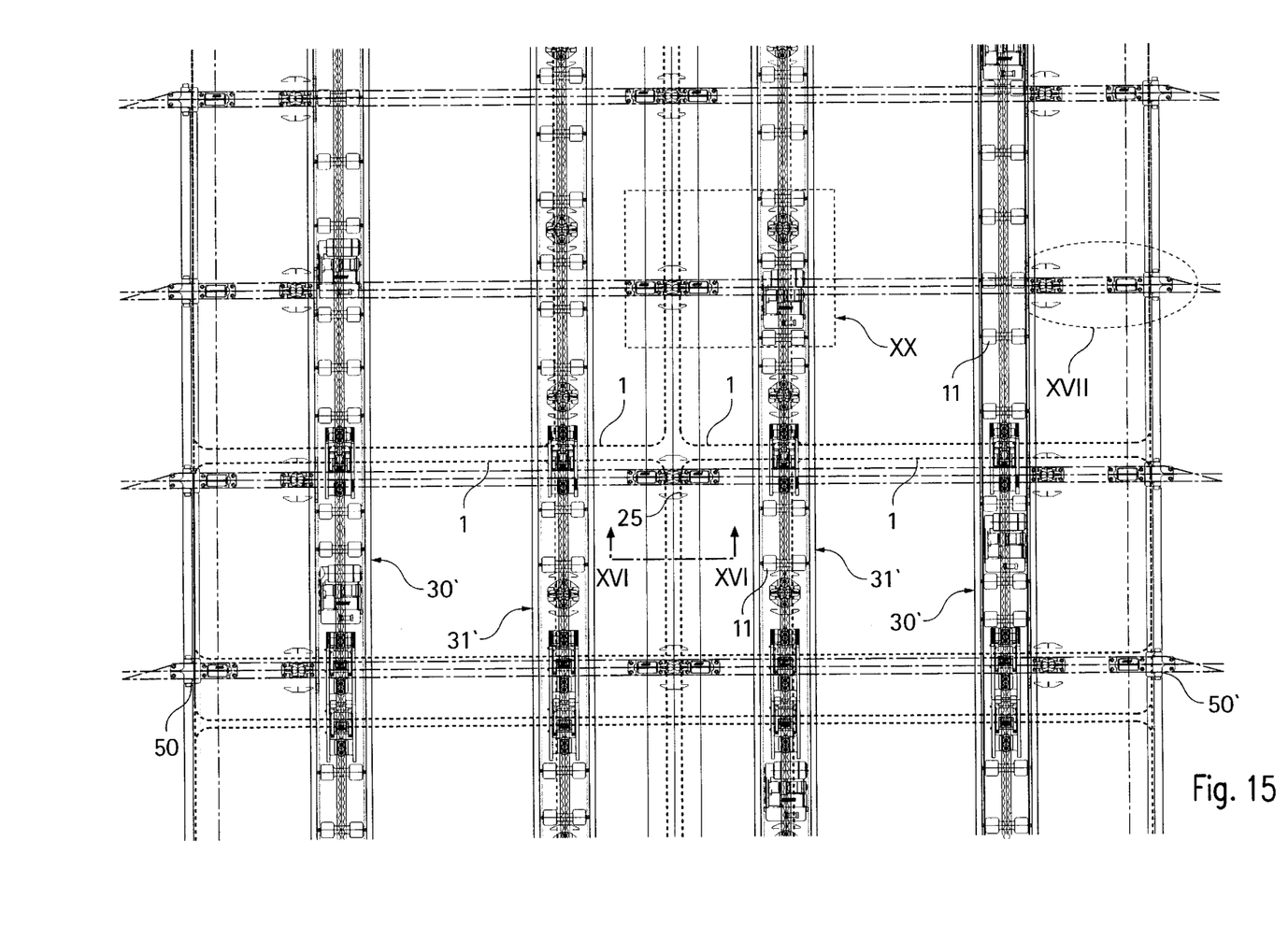
FIG. 15 is a view to an enlarged scale showing in greater detail the region XV in FIG. 1.
Figure 16:
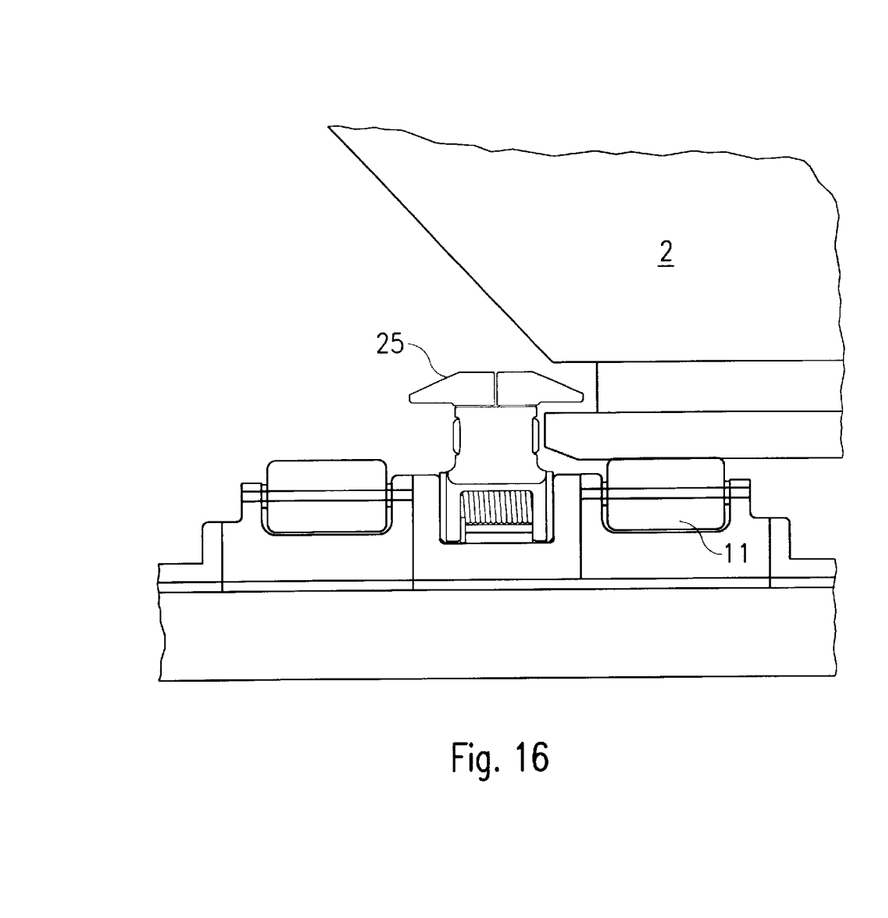
FIG. 16 is a view to an enlarged scale along the line XVI–XVI in FIG. 15.
Figure 17:
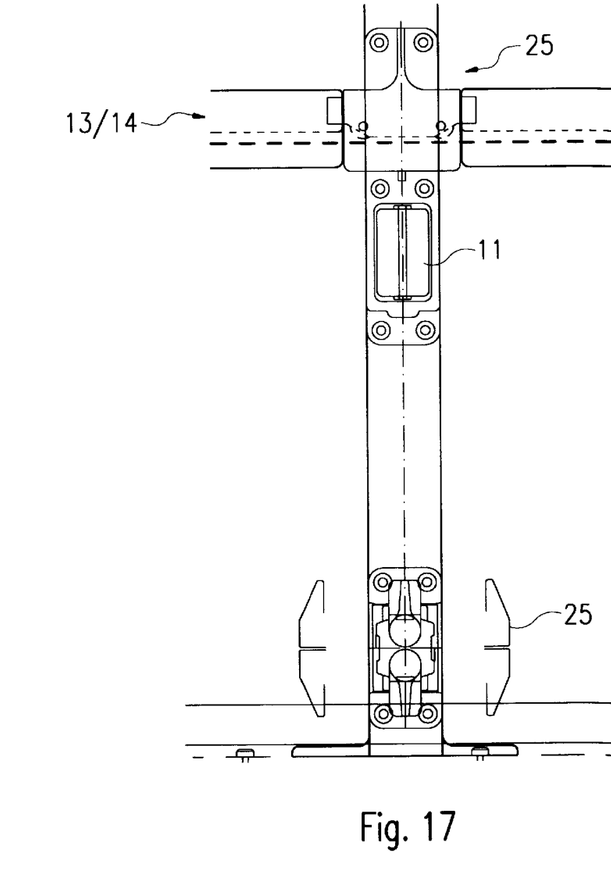
FIG. 17 is a view to an enlarged scale showing in greater detail the region XVII in FIG. 15.

In FIG. 15 it is shown in greater detail how containers 1 are disposed on the cargo deck with, passing under them, the mounting tracks 30, 31; 30', 31' in which the previously shown components, namely support rollers, roller drive units, longitudinal and transverse cargo latches are mounted. The transverse cargo latches 25 in the middle row 40 are thus not installed in special mounting tracks but rather are attached to the cargo deck 10, in such a way that underlying stiffening elements of the cargo deck are included in the attachment so as to increase the stability of the transverse cargo latches 25.

Figure 18:
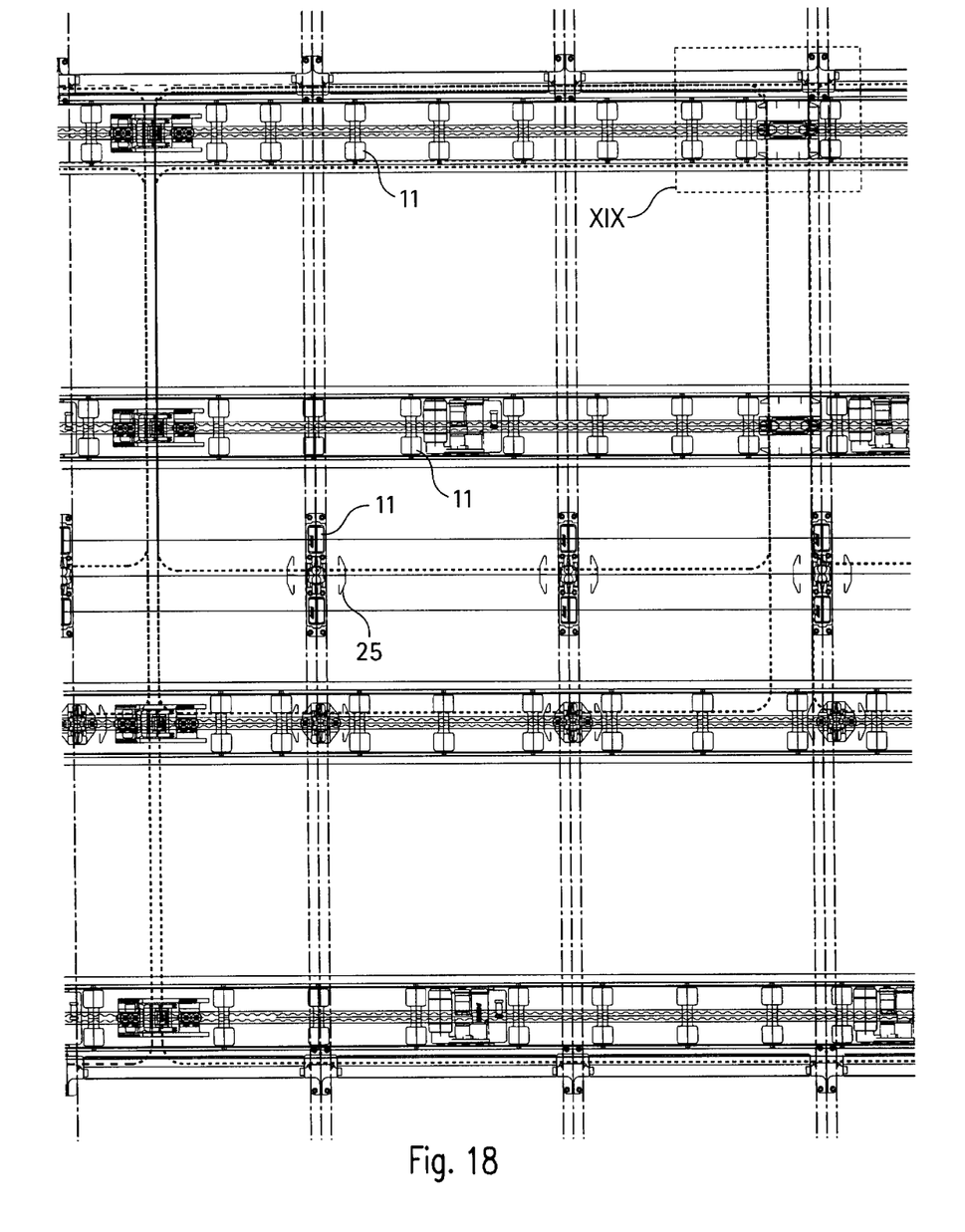
FIG. 18 is a view to an enlarged scale of the region XVIII in FIG. 1.
Figure 19:
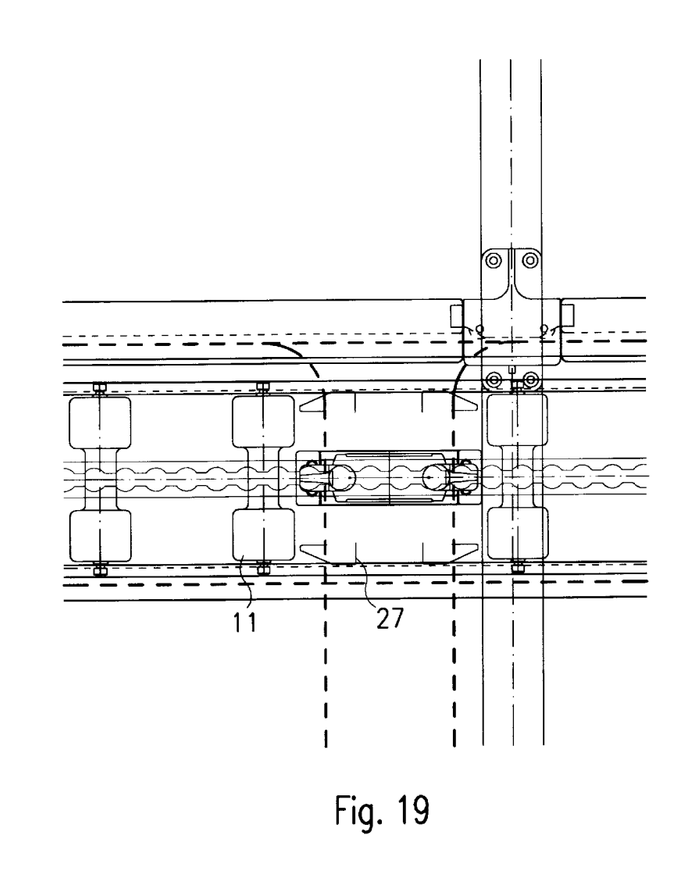
FIG. 19 is a view to an enlarged scale of the region XIX in FIG. 18.
Figure 20:
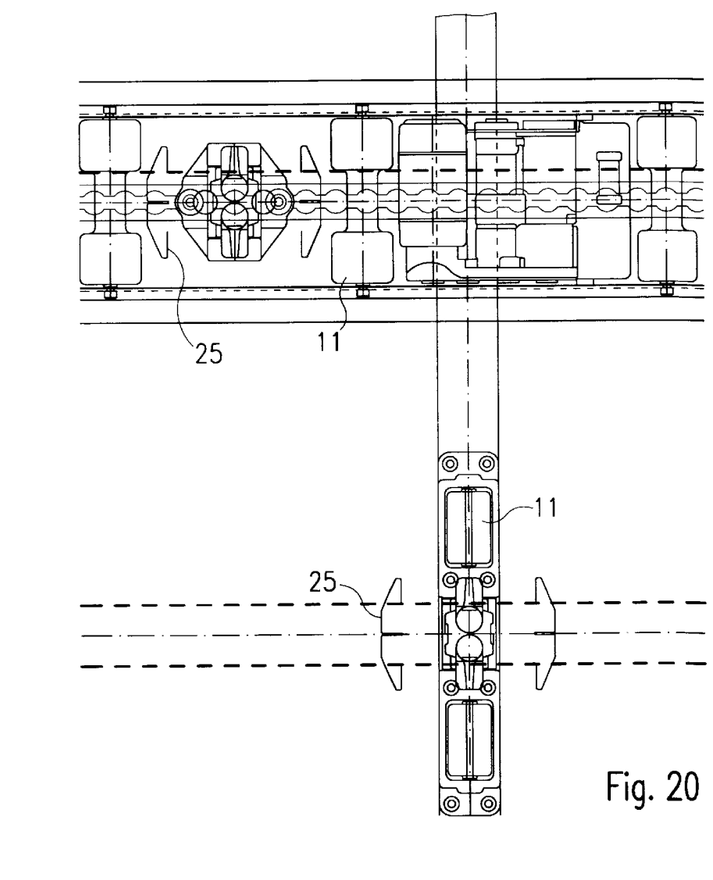
FIG. 20 is a view to an enlarged scale of the region XX in FIG. 15.

FIG. 18 shows how the smaller cargo holders can be positioned. The parts of other drawings that are enlarged in FIGS. 19 and 20 show how a longitudinal cargo latch 27 is seated between two containers, namely in such a way that its latch hooks that extend forward and backward (in the x direction of the cargo deck; in FIG. 19 the hooks are folded down) can grip edges of the two containers. The positioning of the longitudinal cargo latches 27 is brought about in quite a simple manner, by shifting within the perforated rails of the mounting tracks 30, 30'; 31, 31'.

FIG. 20 shows the region of FIG. 15 marked XX in enlarged plan view, to explain the arrangement of transverse cargo latches 25 and roller drive units 20 as well as the middle transverse cargo latches 25, which in each case have support rollers 11 seated next to them.

From the above it will be evident that with the proposed arrangement, owing to easy and variable mounting an optimal loading of an aircraft is possible even when the cargo space is constricted in places by other installed equipment.

What is claimed is:

1. A loading system for loading a cargo deck in a cargo space of an aircraft with standardized cargo holders comprising a plurality of support rollers for supporting a cargo holder and conveying it along a long axis of the cargo space of the aircraft;

a plurality of roller drive units for propelling a cargo holder;

a plurality of transverse cargo latches for fixing and locking a cargo holder into position in a direction transverse to said long axis;

two pairs of mounting tracks for mounting the support rollers and said transverse cargo latches;

a middle row of transverse cargo latches located between the two pairs of mounting tracks;

a plurality of longitudinal cargo latches for fixing and locking a cargo holder into position in the direction of said long axis; and first and second rows of further side-mounted transverse cargo latches which are respectively located at a first outer edge of the cargo deck and at a second outer edge of the cargo deck on an opposite side to the first outer edge;

the two pairs of mounting tracks being respectively disposed between the middle row and one of the first and the second rows of side-mounted transverse cargo latches, and each pair of mounting tracks comprising an outer mounting track and an inner mounting track, and the distance between the outer mounting track of each pair of mounting tracks and the middle row of transverse cargo latches corresponding to a first, lesser fixation distance of a first relatively smaller standardized cargo holder, and the distance between the outer mounting track of each pair of mounting tracks and the inner mounting track of the opposite pair of mounting tracks corresponding to a second, greater fixation distance of a second relatively larger standardized cargo holder.

2. A loading system as claimed in claim 1, wherein the outer mounting tracks are constructed so that side-mounted transverse cargo latches can be mounted thereon.

3. A loading system as claimed in claim 1, wherein the distance between each of the first and second rows of side-mounted transverse cargo latches and the inner mounting track closest to that row corresponds to the first, lesser fixation distance.

4. A loading system as claimed in claim 1, wherein the distance between each of the first and second rows of side-mounted transverse cargo latches and the riddle row of transverse cargo latches corresponds to the second, greater fixation distance.

5. A loading system as claimed in claim 1, wherein the distance between each of the first and second rows of side-mounted transverse cargo latches and the transverse cargo latches mounted on the inner mounting track that is respectively closer to each of the second and first outer edge of the cargo deck corresponds to the second, greater fixation distance.

6. A loading system as claimed in claim 1, wherein roller drive units are installed in the mounting tracks.

7. A loading system as claimed in claim 1, wherein the cargo deck defines recesses in which roller drive units can be installed.

8. A loading system as claimed in claim 7, wherein the recesses are disposed between the inner and outer mounting tracks of the pairs of mounting tracks.

9. A loading system as claimed in claim 1, wherein the mounting tracks are designed for the installation of longitudinal cargo latches.

10. A loading system as claimed in claim 1, wherein braking rollers are provided in the mounting tracks.

11. A loading system as claimed in claim 1, wherein a drainage arrangement is provided and disposed so that water in or on at least one of the mounting tracks and the cargo deck can be conducted away.

\* \* \* \* \*